(12) United States Patent
Moos et al.

(10) Patent No.: US 8,750,522 B2
(45) Date of Patent: Jun. 10, 2014

(54) METHOD AND SECURITY SYSTEM FOR THE SECURE AND UNEQUIVOCAL ENCODING OF A SECURITY MODULE

(75) Inventors: Rainer Moos, Siegen (DE); Klaus Dieter Schmidt, Dietzhölztal (DE); Jörg Breuer, Kreuztal (DE)

(73) Assignee: Deutsche Telekom AG, Bonn (DE)

( * ) Notice: Subject to any disclaimer, the term of this patent is extended or adjusted under 35 U.S.C. 154(b) by 1270 days.

(21) Appl. No.: 11/661,512

(22) PCT Filed: Aug. 2, 2005

(86) PCT No.: PCT/DE2005/001358
§ 371 (c)(1),
(2), (4) Date: Dec. 18, 2007

(87) PCT Pub. No.: WO2006/021178
PCT Pub. Date: Mar. 2, 2006

(65) Prior Publication Data
US 2008/0205654 A1    Aug. 28, 2008

(30) Foreign Application Priority Data
Aug. 26, 2004  (DE) .................. 10 2004 041 603

(51) Int. Cl.
*H04L 9/08*  (2006.01)
(52) U.S. Cl.
USPC ........................................ 380/278; 713/155

(58) Field of Classification Search
USPC .............. 380/44, 277–279, 28; 713/155–156, 713/185
See application file for complete search history.

(56) References Cited

U.S. PATENT DOCUMENTS

| | | | |
|---|---|---|---|
| 5,745,571 A | 4/1998 | Zuk et al. | |
| 5,805,204 A | 9/1998 | Thompson et al. | |
| 6,005,943 A * | 12/1999 | Cohen et al. ................ | 380/30 |
| 6,868,408 B1 * | 3/2005 | Rosen ............................ | 705/64 |
| 2003/0126450 A1 | 7/2003 | Master et al. | |
| 2007/0135164 A1 * | 6/2007 | Lee .............................. | 455/558 |

FOREIGN PATENT DOCUMENTS

EP    1 322 086    6/2003

* cited by examiner

*Primary Examiner* — Kambiz Zand
*Assistant Examiner* — Jing Sims
(74) *Attorney, Agent, or Firm* — Kenyon & Kenyon LLP

(57) ABSTRACT

A method and security system is provided for the secure and unequivocal encoding of a security module, for example, a chip card. A security module may be personalized during the manufacturing process in a secure environment, the manufacturer storing a unique identifier ($ID_{SM1}$) in a memory of the security module. The secure encoding to ensure the uniqueness of the security module is achieved because the item of information to be kept secret and intended for the security module is encrypted not only by a communication key, but by the unique identifier ($ID_{SM1}$) of the security module. This ensures that the item of information to be kept secret is able to be decrypted only by the security module with which the unique identifier ($ID_{SM1}$) is associated, and used for safety-relevant applications.

10 Claims, 2 Drawing Sheets

METHOD AND SECURITY SYSTEM FOR THE SECURE AND UNEQUIVOCAL ENCODING OF A SECURITY MODULE

FIELD OF THE INVENTION

The present invention relates to a method and a security system for the secure and unequivocal encoding of a security module, for example, a chip card.

BACKGROUND INFORMATION

Security modules in the form of chip cards or in the form of PC plug-in cards, for example, have become available in the field of data security. Such security modules include a secure area where an electronic secret, for example, a cryptographic key, may be stored safely. Further, cryptographic computational processes are executed in the secure area of the security module, so that the cryptographic key to be kept secret need never leave the security module.

In the encoding and personalization of security modules in the field of data security it must be ensured that a security module is unique and that its safety-relevant information cannot be copied. The quality and the security level of such security modules are verified by the manufacturer with the aid of third party security evaluations according to specified guidelines. The "Information Technology Security Evaluation Criteria" (ITSEC) or the "Common Criteria for IT Security Evaluation" provide standardized guidelines.

Applications that use such security modules for the electronic signature, for example, likewise demand security evaluations and the uniqueness of security modules.

In order to use security modules for safety-relevant applications, for instance, to conduct electronic bank transfers from a PC, it must be ensured that the secret information is able to be input into the security module in a secure manner. This operation may also be referred to as "encoding of the security module".

The manufacturer usually provides the security modules in evaluated form. The encoding and personalization of a security module, i.e., ensuring the uniqueness of a security module, must take place in a secure environment. The secret information required for encoding a security module, such as a cryptographic key, is generated in a separate key generator whose level of quality and security must be evaluated as well.

When inputting, i.e., while encoding the secret information, into the security module, there is the risk that the information is monitored during the communication and subsequently used to duplicate a security module.

The copy protection is realized with the aid of organizational guidelines and the use of evaluable systems in especially secure application environments such as a trust center or other trustworthy entities. The overall system used to personalize and encode security modules and to generate the secret information required for the encoding must likewise be evaluated appropriately. The use of conventional systems therefore requires an environment that is especially secure and prevents a physical separation of the processes for personalization, encoding and generating secret information to ensure the uniqueness of a security module.

SUMMARY OF THE INVENTION

Embodiments of the present invention provide a method and a security system for the secure and unequivocal encoding of a security module, which make it possible to ensure the uniqueness of security modules not by the use of a central trustworthy entity, but by decentralized systems.

In an embodiment of the present invention, data is generated containing an electronic secret such as cryptographic keys in such a way that the generated data is able to be used in a single security module only, without the need for the security module to be connected to an encoding device during the production process. This makes it possible to physically and temporally separate the processes for producing, personalizing and encoding a security module.

Accordingly, a method for the secure and unequivocal encoding of a security module is provided, for example, a chip card. According to the method, a secret first communication key and a unique identifier are stored in at least one security module in a secure environment. "Unique identifier" within the scope of an embodiment of the present invention means that a single identifier that exists only once is unequivocally assigned to each security module to be encoded. In an embodiment, the unique identifier of the at least one security module, and a second communication key, which has a specified relationship to the secret first communication key stored in the security module, are stored in a first secure device.

In an embodiment, the first and second communication key may be identical in order to allow a symmetrical cryptographic method. On the other hand, the second communication key may also be the public key of the manufacturer of security modules, and the first communication key the private key of the manufacturer in order to allow an asymmetrical cryptographic method.

Furthermore, it should be noted in this context that a secure device means a safe environment (space) in which non-secure components may be set up. As an alternative, a secure facility may also be a secure facility that is able to be evaluated.

In an embodiment, in the first secure facility an item of information intended for the security module is generated. Using the second communication key and the unique identifier of the security module, this item of information is encrypted and stored in a storage device. In an embodiment, for example, after identification of the security module, the encrypted item of information is read out from the storage device and transmitted to the security module. Using the secret first communication key and the unique identifier, the encrypted item of information is decrypted in the security system and stored therein. A specified secure region where the information, which preferably includes a secret cryptographic key, is able to be stored, is, for example, implemented in the security module.

In an embodiment, the identification of the security module vis-á-vis the storage device that includes the encrypted item of information, may be implemented by initially storing both the encrypted item of information and the unique identifier of the security module in the storage device, the unique identifier serving as address for retrieving the encrypted item of information in the storage device. Furthermore, a communication connection between the security module and the first or a second secure device is established. For example, in response to a request, the unique identifier is transmitted from the security module to the first or second secure device via the communication connection. In response to the received identifier, the associated encrypted item of information is read out from the storage device and transmitted to the security module.

The unique identifier and the secret first communication key are, for example, stored in a memory implemented in the security module during production of the security module.

In an embodiment, in order to enable the security module to check on its own whether it is the intended recipient of the received encrypted item of information, not only the item of information intended for the security module but also the unique identifier of the security module are encrypted in the first secure device using the second communication key and the unique identifier. The received encrypted item of information and the encrypted identifier are then decoded in the security module. The decrypted identifier is compared to the unique identifier stored in the security module and, if the two identifiers match, the decrypted item of information is stored in the security module.

In an embodiment, the items of information intended for the security module may be encrypted or decrypted with the aid of a symmetrical encryption method or with the aid of an asymmetrical encryption method. In the symmetrical method embodiment, there is a match between the first and second communication key. In the asymmetrical encryption method embodiment, the second communication key may be the public key of the manufacturer of the security module.

The above-mentioned situation is likewise achieved by a security system embodiment of the present invention. Accordingly, the security system has a device for generating at least one secret first communication key and at least one unique identifier. A device for inputting a secret first communication key and a unique identifier into a specified security module is provided as well. Furthermore, a first secure device is provided, which has a storage device for storing the unique identifier of the at least one security module, and at least one second communication key, which has a specified relationship to the secret first communication key stored in the security module; an information generator for generating an item of information intended for the at least one security module; and an encryption device, which is designed to encrypt the item of information using the second communication key and the unique identifier of the at least one security module. A storage device is used to store the encrypted item of information and the associated unique identifier. An encoding device, which is designed to request the identifier of the security module, to read out the encrypted item of information associated with the identifier from the storage device, and to control the transmission of the encrypted item of information to the security module, is able to be connected to the security module. The security module has a device for decrypting the encrypted item of information using the secret first communication key and the unique identifier, as well as a memory for storing the decrypted item of information.

According to an embodiment of the present invention, the storage device and the encoding device are implemented in the first secure device.

According to an alternative embodiment, the encoding device is implemented in a second secure device. In this case, the memory device is designed as mobile data carrier, which may be used in the first and second security device.

In order to allow the security module to check on its own whether it is the intended recipient of a received encrypted item of information, the encryption device is also designed to encrypt the unique identifier of the at least one security module. In a further embodiment, the decryption device is designed to decrypt the encrypted identifier. A comparator unit is utilized to compare the decrypted identifier with the individual key of the security module. If there is a match between the two compared identifiers, the decrypted item of information will be stored in the memory.

DETAILED DESCRIPTION

Figure 1:
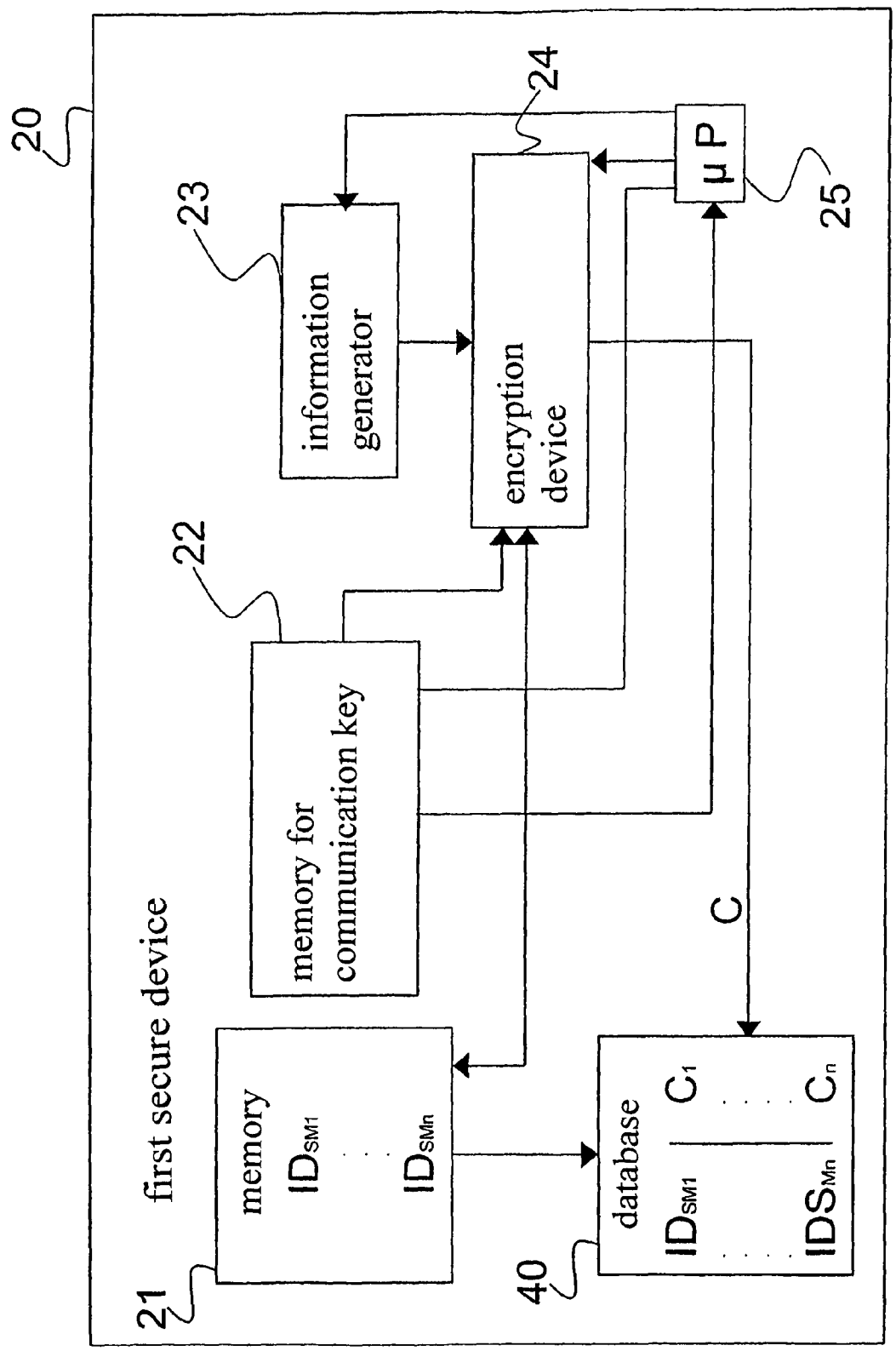
FIG. 1 shows a schematic block diagram of a first secure device.

FIG. 1 shows a first secure device 10 whose main task consists of generating secret items of information for selectively chosen security modules. To this end, as will be described later, first secure device 10 has a memory 21 where unique identifiers $ID_{SM1}$ to $ID_{SMn}$, which are assigned to the security modules to be encoded, are stored. At least one communication key is stored in a second memory 22. In addition, first secure device 20 has an information generator 23, which is able to generate an item of information to be kept secret, for example, a secret cryptographic key, which is used to encode a specific security module. Information generator 23 forwards an item of generated information to an encryption device 24. Encryption device 24 accesses memories 21 and 22 in order to encrypt the item of information received from information generator 23, using the communication key stored in memory 22 and an identifier unequivocally assigned to a security module. In addition to the item of information generated by information generator 23, encryption device 24 is also able to encrypt a unique identifier stored in memory 21. Encrypted item of information c output by encryption device 24 is then stored in a database 40 together with the associated identifier. The identifier stored in connection with an encrypted item of information is used as address under which the encrypted item of information is able to be found in database 40. The monitoring and control of first secure device 20 is assumed by a microprocessor 25. The program controlling microprocessor 25 is stored in a memory (not shown).

Figure 2:
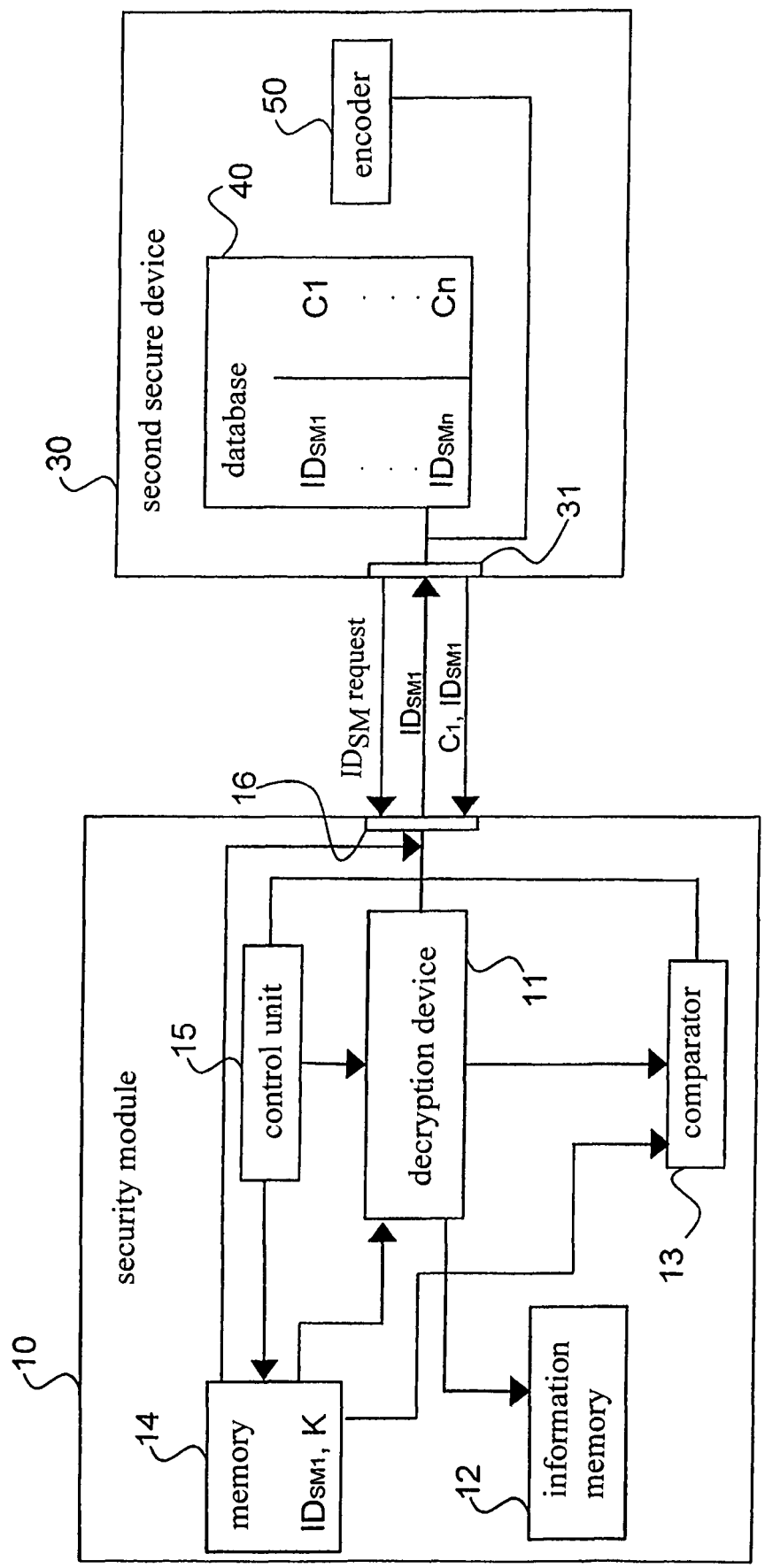
FIG. 2 shows a security module, which is connected to a second secure device.

FIG. 2 shows a security module 10 to be encoded, which is already connected to a second secure device 30.

Further, FIG. 2 shows that database 40 shown in FIG. 1 can be inserted in second secure device 30. In the example illustrated, database 40 is designed as mobile data carrier, which may be inserted both in first secure device 20 and second secure device 30. In a further embodiment, an encoder 50 is implemented in second secure device 30, which is used to read out from database 40 secret information $_{c1}$ required for the secure encoding of security module 10, and to transmit it to security module 10. In addition, second secure device 30 has a communication interface 31 via which it is able to communicate with security module 10. Security module 10 includes an interface 16 for this purpose.

In a further embodiment, security module 10 has a memory 14 in which, during production of security module 10, the manufacturer stores a unique $ID_{SM1}$, i.e., an identifier assigned exclusively to security module 10, and a secret communication key. In addition, security module 10 has a decryption device 11, which is able to decrypt an encrypted item of information coming from second secure device 30 with the aid of unique identifier $ID_{SM1}$ and the secret communication key. Decryption device 11 is connected to an information memory 12 in which the decrypted item of information is able to be stored in a secure manner. Memory 14 and decryption device 11 are connected to a comparator 13, which is able to compare an encrypted identifier received from second secure device 30 to unique identifier $ID_{SM1}$ stored in memory 14. A control unit 15 is used, among others, to induce decryption device 11 to store the decrypted item of information in information memory 12, provided comparator 13 has determined that the identifiers match.

The encoder 50 may also be implemented in first secure device 20. In this case first secure device 20 has a communication interface via which it is able to communicate with security module 10. A physical separation of first secure device 10, which generates the item of information intended for the security module with the aid of information generator 23, and second secure device 30, which implements the encoding of security module 10, is not required in this case.

The example method of functioning of the security system illustrated in FIGS. 1 and 2, includes security module 10 as well as first secure device 20 and second secure device 30, and is explained in greater detail below.

In an embodiment, in order to allow a temporal and physical separation of the personalization of a security module, the generation of a secret item of information, and the encoding of a security module, the following prerequisites need to be satisfied:

Security module 10 to be encoded must be able to compute cryptographic processes and to securely store a cryptographic key required for this purpose, for example, in memory 14.

Upon request, a security module 10 to be encoded provides an unequivocal, utilizable item of information, i.e., a unique identifier, which is stored in memory 14 during production of security module 10, for example.

Encryption device 24 implemented in first secure device 20 is able to compute the same cryptographic processes that security module 10 to be encoded is using as well.

The manufacturers of security modules provide an exact list of the unique identifiers of the particular security modules to be encoded.

The process in which an item of information is generated, and the way in which the item of information is stored in a selected security module take place inside an evaluable area.

It should be assumed now that a module manufacturer ensures during production of security module 10 that unique identifier $ID_{SM1}$ and a secret communication key are stored in memory 14. This process relates to the personalization of security module 10. Of course, this method may also be used to personalize a plurality of security modules, even those of different manufacturers. In addition, the manufacturer of security module 10 ensures that unique identifier $ID_{SM1}$ of security module 10 safely reaches first secure device 20 and is stored there in memory 21. In this manner, the unique identifiers of all security modules to be encoded are able to reach first secure device 20 and be stored in memory 21. A communication key, which is part of the communication key stored in security module 10, is stored in memory 22. In an embodiment of the present invention, it is to be assumed that both communication keys are identical and thus allow a symmetrical cryptographic method. In a further embodiment, the communication key stored in memory 22 is the public key of the manufacturer and the communication key stored in memory 14 of security module 10 is the private key of the manufacturer. In this case, the selected communication keys would support an asymmetrical cryptographic method, the so-called public key method. If a plurality of security modules by one and the same or by different manufacturers is to be encoded, and if a symmetrical key method is used, the communication keys stored in the security modules must be stored in memory 22. If the public key method is used, the public keys of the particular manufacturers must be stored in memory 22.

It should now be assumed that the module manufacturer hands over at least security module 10 to the operator of second secure device 30 so that security module 10 may be encoded.

Information generator 23 thereupon generates an item of information to be kept secret, which later is to be input into security module 10 in a secure manner, i.e., is to be encoded. Information generator 23 then hands over the information to be kept secret to encryption device 24. Encryption device 24 reads unique identifier $ID_{SM1}$ of security module 10 to be encoded out from memory 21 and the communication key from memory 22, and encrypts the item of information to be kept secret using both unique identifier $ID_{SM1}$ and the communication key. For example, identifier $ID_{SM1}$ read out of memory 21 is encrypted in a corresponding manner as well. Information $C_1$ encrypted for encoding security module 10, encrypted identifier $ID_{SM1}$, and non-encrypted identifier $ID_{SM1}$ are written into database 40. Identifier $ID_{SM1}$ stored in database 40 is used as address under which encrypted information $C_1$ stored in this context may be found in database 40.

As shown in FIGS. 1 and 2, first secure device 20 and second secure device 30 are designed as physically separate devices. As a result, in an embodiment, database 40 must be removed from first secure device 20 and brought in a secure manner to second secure device 30 where it is inserted. Before security module 10 is able to be encoded, a communication connection must be established between security module 10 and second secure device 30, as shown in FIG. 2. To this end, security module 10 may be completely inserted into second secure device 30. As an alternative embodiment, security module 10 and second secure device 30 are configured as separate devices, which must then be accommodated inside a secure area. A special communication software which is stored in both security module 10 and second secure device 30, initially induces second secure device 30, for example, encoder 50, to transmit an $ID_{SM}$ request signal to control unit 15 of security module 10. Thereupon, control unit 15 is controlled such that it reads identifier $ID_{SM1}$ out of memory 14 and transmits it to encoder 50. Encoder 50 is then controlled in such a way that it applies received identifier $ID_{SM1}$ as address signal to database 40 and reads out encrypted item of information $C_1$ stored under this address as well as encrypted identifier $ID_{SM1}$ and transmits them to security module 10. The described data exchange between security module 10 and second secure device 30 is schematically represented by the three communication paths drawn in between interfaces 16 and 31.

Control device 15 now ensures that encrypted identifier $ID_{SM1}$ is decrypted in decryption device 11 with the aid of the secret communication key and identifier $ID_{SM1}$ stored in memory 14. Control unit 15 thereupon controls comparator 13 in such a way that unique identifier $ID_{SM1}$ stored in memory 14 is compared to the decrypted identifier. If there is a match between the two identifiers, control unit 15 induces decryption device 11 to decrypt decrypted information $C_1$ to be kept secret, if this has not been done already, and to store it in information memory 12.

Using the described security system, a security module may be encoded in such a way that its uniqueness is able to be ensured, without the processes of personalization of a security module, the information generation in information generator 23, and the encoding of the security module with the aid of encoder 50 having to be executed in a shared, especially secure environment. Instead, as illustrated in FIGS. 1 and 2, even information generator 23 and encoder 50 may be operated in physically separate spaces in different secure environments.

In an embodiment of the present invention, the security module 10 is personalized during the manufacturing process in a secure environment in that the manufacturer stores a unique identifier, i.e., one that is generated only once, in memory 14 of the security module. The secure encoding as guarantee of the uniqueness of security module 10 is achieved in that the secret information intended for security module 10 is encrypted not only by using a communication key, but by using unique identifier $ID_{SM1}$ of security module 10. This ensures that the secret item of information may be decrypted only by security module 10 and used for safety-relevant applications.

What is claimed is:

1. A method for secure and unequivocal encoding of a security module chip card, comprising:
   a secret first communication key and a unique identifier are stored in a security module in a secure environment;
   the unique identifier of the security module and a second communication key, which has a specified relationship to the secret first communication key stored in the security module, are stored in a first secure device;
   an item of information intended for the security module is generated in the first secure device;
   the item of information is encrypted using the second communication key and the unique identifier of the security module, and stored in a storage device;
   the encrypted item of information is read out from the storage device and transmitted to the security module; and,
   using the secret first communication key and the unique identifier, the encrypted item of information is decrypted in the security module and stored therein,
   wherein the method prevents a physical separation of the processes of storing, separating, and generating by having the item of information be usable only by the security module chip card.

2. The method as recited in claim 1, wherein the encrypted item of information is stored in the storage device together with the unique identifier of the security module;
   a communication connection is established between the security module and the first or a second secure device;
   the unique identifier is transmitted from the security module to the first or the second secure device via the communication connection;
   in response to the received unique identifier, the associated encrypted item of information is read out from the storage device and transmitted to the security module.

3. The method as recited in claim 1, wherein the unique identifier and the secret first communication key are stored in the security module during its manufacture.

4. The method as recited in claim 1, wherein the item of information intended for the security module, and the unique identifier of the security module are encrypted in the first secure device using the second communication key and the unique identifier;
   the encrypted item of information and the encrypted unique identifier are decrypted in the security module;
   the decrypted unique identifier is compared to the unique identifier stored in the security module; and
   the decrypted item of information is stored in the security module if the two unique identifiers match.

5. The method as recited in claim 1, wherein the item of information includes a cryptographic key and is stored in a secure area of the security module.

6. The method as recited in claim 1, wherein the second communication key corresponds to the first secret communication key or represents the public key of the manufacturer of the security module.

7. A security system for secure and unequivocal encoding of at least one security module, in particular a chip card, comprising:
   a generator, the generator outputting at least one secret first communication key and at least one unique identifier;
   an interface via which the at least one secret first communication key and the at least one unique identifier into a specific security module are inputted;
   a first secure device, which includes a storage device for storing the respective unique identifier of the security module and at least one second communication key, which has a specified relationship to the secret first communication key stored in the security module, an information generator to output an item of information intended for the security module, and an encryption device, which is designed to encrypt the item of information using the second communication key and the unique identifier of the security module;
   a storage device which stores the encrypted item of information and the associated unique identifier;
   an encoding device connectable to the security module, the encoding device requesting the unique identifier of the security module, to read out the encrypted item of information associated with the unique identifier, from the storage device and to control the transmission of the encrypted item of information to the security module,
   the security module having a decryptor for decrypting the encrypted item of information using the secret first communication key and the unique identifier as well as a memory for storing the decrypted item of information,
   wherein the method prevents a physical separation of the processes of storing, separating, and generating by having the item of information be usable only by the security module chip card.

8. The security system as recited in claim 7, wherein the storage device and the encoding device are implemented in the first secure device.

9. The security system as recited in claim 7, wherein the encoding device is implemented in a second secure device; and
   the storage device is a mobile data carrier, which is able to be inserted into the first and second security device.

10. The security system as recited in claim 7, wherein, the encryption device is designed to encrypt the unique identifier of the security module; the decryption device is also designed to decrypt the encrypted identifier; and a comparison device for comparing the decrypted identifier to the unique identifier of the security module is provided, the decrypted item of information being stored in the memory if the two compared identifiers match.

* * * * *